United States Patent
Park et al.

(10) Patent No.: US 10,009,546 B2
(45) Date of Patent: Jun. 26, 2018

(54) OPTICAL IMAGING DEVICE

(71) Applicant: ELECTRONICS AND TELECOMMUNICATIONS RESEARCH INSTITUTE, Daejeon (KR)

(72) Inventors: Sun Tak Park, Incheon (KR); Ki Uk Kyung, Daejeon (KR); Sae Kwang Nam, Daejeon (KR); Bong Je Park, Daejeon (KR); Seung Koo Park, Daejeon (KR); Sung Ryul Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/183,606

(22) Filed: Jun. 15, 2016

(65) Prior Publication Data

US 2017/0214859 A1   Jul. 27, 2017

(30) Foreign Application Priority Data

Jan. 26, 2016   (KR) ........................ 10-2016-0009296

(51) Int. Cl.
*H04N 5/225* (2006.01)
*H04N 5/232* (2006.01)
*H04N 5/357* (2011.01)

(52) U.S. Cl.
CPC ....... *H04N 5/23296* (2013.01); *H04N 5/2253* (2013.01); *H04N 5/3572* (2013.01)

(58) Field of Classification Search
CPC .......... H04N 5/23248; H04N 5/23287; H04N 5/2254; H04N 5/2253; H04N 5/2257; G03B 2205/0015; G03B 2217/002; G06K 9/209
See application file for complete search history.

(56) References Cited

U.S. PATENT DOCUMENTS

| | | | |
|---|---|---|---|
| 7,893,965 B2 | 2/2011 | Heim et al. | |
| 9,151,665 B1* | 10/2015 | Lewkow | ................... G01J 1/04 |
| 9,570,488 B2* | 2/2017 | McKnight | ......... H01L 27/14607 |
| 2006/0038183 A1* | 2/2006 | Oliver | ............... H01L 27/14618 |
| | | | 257/79 |
| 2006/0044463 A1 | 3/2006 | Talley et al. | |
| 2006/0186492 A1* | 8/2006 | Boettiger | .......... H01L 27/14601 |
| | | | 257/414 |
| 2012/0026312 A1* | 2/2012 | Sander | ............... G02B 21/0012 |
| | | | 348/79 |
| 2012/0299140 A1* | 11/2012 | Sekine | .............. H01L 27/14607 |
| | | | 257/432 |
| 2015/0043094 A1 | 2/2015 | Kyung et al. | |
| 2015/0272428 A1 | 10/2015 | Nam et al. | |
| 2015/0350499 A1* | 12/2015 | Topliss | ................. H04N 5/2253 |
| | | | 348/373 |

FOREIGN PATENT DOCUMENTS

KR   10-0921145 B1   10/2009
KR   10-2015-0067707 A   6/2015

* cited by examiner

*Primary Examiner* — Kelly L Jerabek

(57) ABSTRACT

There is provided an optical imaging device including a flexible image sensor and an actuator that expands or contracts the flexible image sensor on a two-dimensional plane. It is possible to minimize distortion aberration and control a viewing angle and magnification.

10 Claims, 6 Drawing Sheets

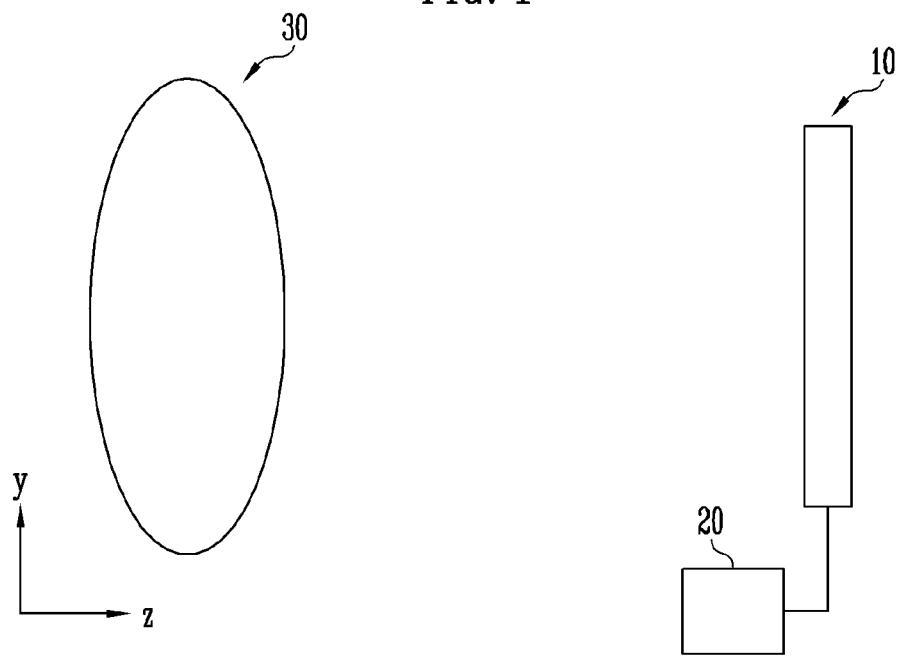
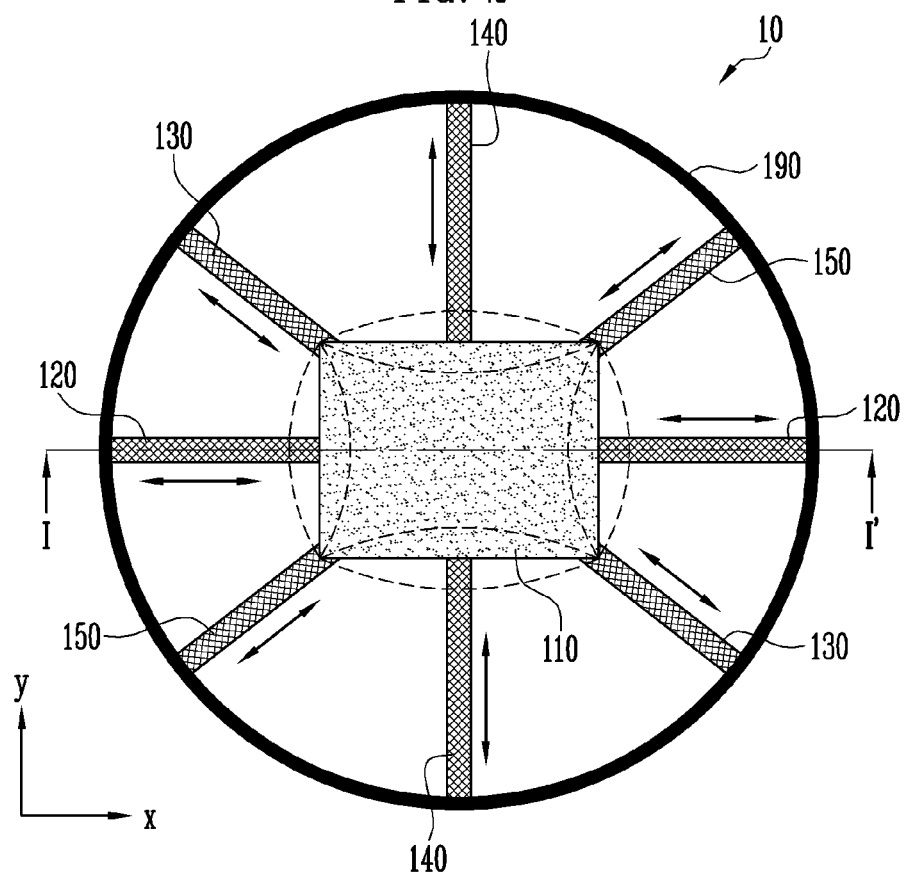

OPTICAL IMAGING DEVICE

CROSS-REFERENCE TO RELATED APPLICATION

This application claims priority to and the benefit of Korean Patent Application No. 10-2016-0009296, filed on Jan. 26, 2016, in the Korean Intellectual Property Office, the entire contents of which are incorporated herein by reference in their entirety.

BACKGROUND

1. Field

An embodiment of the present invention relates to an optical imaging device, and more particularly, to an optical imaging device including a flexible image sensor.

2. Description of the Related Art

A camera capable of storing an image as digital information is being continuously developed. A photographing system of the camera includes an image sensor capable of storing optical intensity information. The image sensor may be, for example, a charge coupled device (CCD) or a complementary metal-oxide-semiconductor (CMOS) device. On the other hand, the image sensor may be formed of a plurality of optical sensor arrays. Studies on the camera including the image sensor capable of having a larger view angle, a higher magnification zoom function, and an image with higher magnification, are being performed. For this purpose, a technology of precisely removing aberration is required.

The aberration mostly increases more at an edge of the image sensor than in a center of the image sensor, which distorts an image. An image of an object is focused on the image sensor through a lens. At this time, light incident on an optical axis of the lens in parallel is correctly focused on an image sensor surface. However, light that forms an angle with the optical axis of the lens, that is, that is incident in an off-axis manner is focused in front of or behind the image sensor without being correctly focused on the image sensor due to the aberration. Therefore, a clear image may be obtained in the center of the image sensor, but a blurred and distorted image is obtained at the edge of the image sensor due to the aberration.

On the other hand, a phenomenon in which the magnification of the image varies with a magnitude of an angle of light incident on the lens so that lateral magnification of the image changes in accordance with a distance from the optical axis is referred to as distortion aberration. When an object such as wire mesh is photographed in parallel with the image sensor surface, the distortion aberration remarkably occurs. Distortion becomes severer toward the edge of the image so that the image is distorted. The distortion aberration has nothing to do with clearness of the image. However, since the distortion aberration matters in measurement or an astronomical observation, the distortion aberration needs to be corrected.

SUMMARY

An embodiment of the present invention relates to an optical imaging device capable of minimizing distortion aberration and controlling a view angle and magnification.

An optical imaging device according to an embodiment of the present invention includes a flexible image sensor and an actuator that expands or contracts the flexible image sensor on a two-dimensional plane.

The optical imaging device may further include a lens that faces the flexible image sensor. The actuator may two-dimensionally expand or contract the flexible image sensor on a plane vertical to an optical axis of the lens.

The optical imaging device may further include a controller that controls a degree of modifying the flexible image sensor by controlling the actuator.

The controller may control the actuator to achieve at least one of minimization of distortion aberration of an image initially obtained by the flexible image sensor, expansion of the initially obtained image, contraction of the initially obtained image, and adjustment of a viewing angle of the initially obtained image.

The actuator may include an electroactive polymer, and the controller may control the actuator by controlling a voltage applied to the actuator.

The actuator may be coupled to at least one edge of the flexible image sensor.

The optical imaging device may further include a support that fixes an end of the actuator, and the actuator may two-dimensionally contact the flexible image sensor as a length from the support to the edge of the flexible image sensor is lengthened.

The actuator may include a variable part, to which the flexible image sensor is coupled, and including an electroactive polymer and a plurality of electrodes partially provided in the variable part, wherein the plurality of electrodes may not overlap the flexible image sensor.

The optical imaging device may further include a support that fixes an end of the actuator such that the end is movable, and the actuator may two-dimensionally expand the flexible image sensor as a length from the support to the edge of the flexible image sensor is reduced.

The support may have a through hole through which the actuator movably penetrates, and the actuator may further extend to pass through the through hole to two-dimensionally expand the flexible image sensor.

The actuator may include a variable part, to which the flexible image sensor is coupled, and including an electroactive polymer; and a plurality of electrodes at least partially provided in the variable part, wherein at least one of the plurality of electrodes may overlap the flexible image sensor.

The flexible image sensor may include a plurality of pixel electrodes, and the plurality of pixel electrodes may be partially embedded in the actuator.

The actuator may include a variable part in which the plurality of pixel electrodes are embedded, and the variable part may include an electroactive polymer.

According to an embodiment of the present invention, since distortion aberration is corrected, an image with high resolution may be obtained. In addition, since the distortion aberration is minimized by changing a two-dimensional shape of a flexible image sensor, it is possible to reduce the number of lenses for correcting aberration or to omit the lenses so that it is possible to implement a small optical imaging device. In addition, it is possible to implement a zoom function such as expansion or contraction and to control a view angle by changing the two-dimensional shape of the flexible image sensor without moving the lens.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a side view of an optical imaging device according to an embodiment of the present invention;

FIG. 2 is a front view of the image sensing module according to the embodiment of FIG. 1;

DETAILED DESCRIPTION

Figure 3:
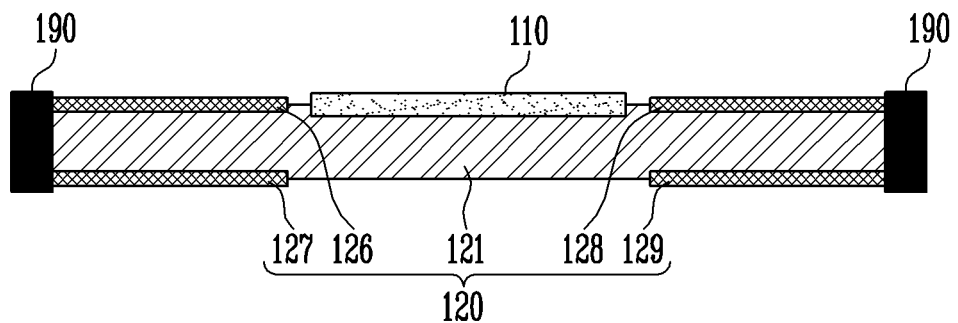
FIG. 3 is a cross-sectional view taken along the line I-I' of FIG. 2.

Advantages and features of the present invention, and implementation methods thereof will be clarified through following embodiments described with reference to the accompanying drawings. The present invention may, however, be embodied in different forms and should not be construed as limited to the embodiments set forth herein. Throughout this specification and the claims that follow, when it is described that an element is "connected" to another element, the element may be "directly connected" to the other element or "electrically connected" to the other element through a third element. In the accompanying drawings, a portion irrelevant to description of the present invention will be omitted for clarity. Like reference numerals refer to like elements throughout.

The scope of the present invention may be applied to any device including an optical device such as a camera and a microscope. Hereinafter, embodiments will be described in detail so that those skilled in the art may easily perform the present invention with reference to the accompanying drawings.

FIG. 1 is a side view of an optical imaging device according to an embodiment of the present invention. The optical imaging device according to the embodiment of the present invention includes an image sensing module 10, a controller 20 for controlling the image sensing module 10, and a lens 30.

For convenience sake, an axis parallel to an optical axis of the lens 30 is represented as the z axis of FIG. 1. A plane parallel to a flexible image sensor 110 is represented as the xy plane of FIG. 2. A plane of the flexible image sensor 110 on which an image is focused is perpendicular to the optical axis of the lens 30 and the flexible image sensor 110 is two-dimensionally modified on the xy plane by actuators 120, 130, 140, and 150.

Only one lens 30 is illustrated. However, the present invention is not limited thereto. Two or more lens groups may be provided. In addition, the lens 30 is illustrated as a convex lens. However, the present invention is not limited thereto. According to a function of a device to which the present invention is applied, the lens 30 may be an active lens such as a liquid lens a shape or a focus of which may be changed as well as a concave lens, an aspheric lens, or another atypical lens.

The lens 30 may be selectively transferred along the optical axis in order to perform a zoom function such as expansion or contraction. For this purpose, a transfer device for transferring the lens 30 along the optical axis may be further provided. As the transfer device, a voice coil motor, a piezo motor, or a step motor may be used.

The image sensing module 10 is a module formed such that a shape of the image sensor on which an image is focused is modified. The image sensing module 10 includes the flexible image sensor 110, the actuators 120, 130, 140, and 150 two-dimensionally modifying a shape of the flexible image sensor 110, and a support 190 supporting the actuator.

The flexible image sensor 110 is an image sensor that can expand and contract on an xy plane. The flexible image sensor 110 may include, for example, a semiconductor optical sensor array such as a CCD or CMOS or a flexible nano-optical electronic element array formed on a flexible circuit board. Or, the flexible image sensor 110 may include a 2D nano sheet transition metal dichalcogenide (TMDC), graphene, carbon nano-tube-based optical sensor array formed on a flexible circuit board.

Or, the flexible image sensor 110 may include a photoelectric element array such as a photo sensor or a photo transistor in unit of pixels. At this time, a space between the photo sensors or the photo transistors may be tens of μm, and may be 10 μm or less in order to obtain an image of higher resolution.

FIG. 2 is a plan view of the flexible image sensor 110 viewed from a front side. A front side of the flexible image sensor 110 faces the lens 30. A rear side of the flexible image sensor 110 is coupled to the actuators 120, 130, 140, and 150.

The planar shape of the flexible image sensor 110 viewed from the front side is a substantially rectangular shape. However, according to a device to which the present invention is applied, the planar shape of the flexible image sensor 110 may be a square shape, a circular shape, an oval shape, and any other certain shape, without being limited to a specific shape.

The actuators 120, 130, 140, and 150 may expand or contract as indicated by the arrow direction of FIG. 2 to two-dimensionally modify the flexible image sensor 110. The flexible image sensor 110 may be expanded or contracted two-dimensionally by the actuators 120, 130, 140, and 150 as indicated by the dotted line of FIG. 2.

The actuator includes one horizontal actuator 120, one vertical actuator 140, and two diagonal actuators 130 and 150. Here, the horizontal direction is a direction parallel to the x axis of FIG. 2, and the vertical direction is a direction parallel to the y axis of FIG. 2. The diagonal direction is a direction linking two corners of the flexible image sensor facing each other. For convenience sake, a direction linking an upper left corner of the flexible image sensor 110 and a lower right corner of the flexible image sensor 110 illustrated in FIG. 2 will be called a first diagonal direction, and a direction linking an upper right corner of the flexible image sensor 110 and a lower left corner of the flexible image sensor 110 illustrated in FIG. 2 will be called a second diagonal direction.

The horizontal actuator 120 is an actuator for expanding or contracting the flexible image sensor 110 in a horizontal direction. The horizontal actuator 120 is disposed to pass through a vertical edge of the flexible image sensor 110. In this embodiment, the horizontal actuator 120 is one, but the present invention is not limited thereto and the horizontal actuator 120 may be two or more. The horizontal actuator 120 will be described in more detail with reference to FIG. 3.

The horizontal actuator 120 includes a variable part 121 coupled to a rear side of the flexible image sensor 110 and a plurality of electrodes 126, 127, 128, and 129 positioned on the front side and the rear side of the variable part 121. A degree of expanding or contracting of the variable part 121 in a horizontal direction may be adjusted by controlling a voltage applied to the plurality of electrodes 126, 127, 128, and 129.

The variable part 121 of the horizontal actuator extends in a horizontal direction (x axis direction of FIG. 2) and has a band shape with a thickness, and both end portions thereof are fixed to the support 190. A thickness direction of the variable part 121 is parallel to an optical axis direction of the lens 30. The variable part 121 may include an electroactive polymer. The electroactive polymer is a polymer modified in shape or size in an electric field. The electroactive polymer is known, and thus, a detailed description thereof will be omitted.

The flexible image sensor 110 is coupled to the center of the front side (plane positioned above in FIG. 3) of the variable part 121 of the horizontal actuator, so that when the variable part 121 of the horizontal actuator expands, the flexible image sensor 110 may also expand, and when the horizontal actuator contracts, the flexible image sensor 110 may also contract.

The plurality of electrodes includes a pair of first electrodes 126 and 127 positioned on the left side on the basis of the flexible image sensor 110 and a pair of second electrodes 128 and 129 positioned on the right side on the basis of the flexible image sensor 110. Here, the "first" and "second" added in front of the electrodes are added relatively according to the positions of the electrodes and has nothing to do with characteristic of the electrodes.

The pair of first electrodes include the electrode 126 provided on the provided on the front surface of the variable part 121 of the horizontal actuator and the electrode 127 provided on a rear surface of the variable part 121. The pair of first electrodes 126 and 127 are provided in positions corresponding to each other in a thickness direction. The pair of second electrodes include the electrode 128 provided on the front surface of the variable part 121 of the horizontal actuator and the electrode 129 provided on the rear surface of the variable part 121. The pair of second electrodes 128 and 129 are provided in positions corresponding to each other in a thickness direction.

The first electrode 126 and the second electrode 128 provided on the front surface of the variable part 121 of the horizontal actuator are spaced apart from the flexible image sensor 110. However, the present invention is not limited thereto and the first electrode 126 and the second electrode 128 provided on the front surface of the variable part 121 of the horizontal actuator may at least partially overlap the flexible image sensor 110. At this time, an insulator is further provided between the overlapping portions.

The controller 20 may control a degree of modification of the variable part 121 by controlling a voltage applied between the pair of first electrodes 126 and 127 and the pair of second electrodes 128 and 129. This will be described with reference to FIG. 5.

The vertical actuator 140 is an actuator expanding or contracting the flexible image sensor 110 in a vertical direction. The vertical actuator 140 is disposed to pass through a horizontal edge of the flexible image sensor 110, and extends to the support 190 along a vertical direction. In this embodiment, one vertical actuator 140 is provided, but the present invention is not limited thereto and two or more vertical actuators may be provided.

The two diagonal actuators 130 and 150 are actuators expanding or contracting the flexible image sensor 110 in a diagonal direction. The two diagonal actuators 130 and 150 include a first diagonal actuator 130 and a second diagonal actuator 150.

The flexible image sensor 110 is coupled to a front side of the first diagonal actuator 130 and the first diagonal actuator 130 extends along the first diagonal direction so as to be fixed to the support 190. The flexible image sensor 110 is coupled to the second diagonal actuator 150, and the second diagonal actuator 150 extends along the second diagonal direction so as to be fixed to the support 190.

The first diagonal actuator 130 and the second diagonal actuator 150 may cross each other at the center of a rear side of the flexible image sensor 110.

In this embodiment, two diagonal actuators 130 and 150 are provided. However, the present invention is not limited thereto and the diagonal actuators 130 and 150 may not be provided as necessary or two or more diagonal actuators 130 and 150 may be provided. In another embodiment, an actuator extending in a direction at a certain angle between the horizontal direction and the vertical direction may be further provided.

The vertical actuator 140 and the diagonal actuators 130 and 150 are configured to include a variable part and a plurality of electrodes in the same as those of the horizontal actuator 120 described above with reference to FIG. 3, except that positions thereof are different, and thus, a detailed description will be omitted. Variable parts of the vertical actuator 140 and the diagonal actuators 130 and 150 may include an electroactive polymer, and may control a degree of expansion and contraction by controlling a voltage applied to the electrodes.

The horizontal actuator 120, the vertical actuator 140, and the two diagonal actuators 130 and 150 may cross at the center of the rear side of the flexible image sensor 110. In this embodiment, the actuators 120, 130, 140, and 150 have a band shape overall, but the present invention is not limited thereto.

Intersection portions of the actuators 120, 130, 140, and 150 may have a rectangular shape having a size similar to that of the flexible image sensor 110. At this time, the single rectangular portion where the actuators 120, 130, 140, and 150 cross each other may be coupled to the entire rear side of the flexible image sensor 110.

The aforementioned actuators are merely an embodiment and the present invention is not limited thereto. The actuators may have any configuration that can modify the flexible image sensor 110 two-dimensionally. For example, the actuators may be configured to operate on the basis of a physical method such as using pressure of a gas or a fluid to modify the flexible image sensor. Or, the actuators may be configured to operate by electric or magnetic force to modify the flexible image sensor. Also, the actuators may be configured to widen or narrow a space between pixels, as well as modifying a 2D shape of the flexible image sensor 110.

The support 190 is a circular frame with respect to the xy plane, and fixes the actuators 120, 130, 140 and 150. The support 190 may be a circular frame having a diameter greater than that of the lens 30 in consideration of a maximum size that the flexible image sensor 110 may expand. The support 190 may be formed of an insulating material.

The controller 20 minimizes distortion aberration by modifying the flexible image sensor 110 two-dimensionally by controlling driving of the actuators 120, 130, 140, and 150. In detail, the controller 20 controls a degree of expanding or contracting of the actuators 120, 130, 140, and 150 by controlling a magnitude of a voltage applied to the electrodes provided in each of the actuators 120, 130, 140, and 150.

The controller 20 may independently control a voltage applied to the electrodes of the horizontal actuator 120, a voltage applied to the electrodes of the vertical actuator 140, a voltage applied to the electrodes of the first diagonal actuator 130, and a voltage applied to the electrodes of the second diagonal actuator 150.

The controller 20 may determine a magnitude of a voltage applied to the electrodes of each of the actuators 120, 130, 140, and 150 on the basis of a degree of distortion aberration of an image focused on the flexible image sensor 110 at an initial stage, that is, in a state of not being modified.

The controller 20 may determine a degree of distortion aberration of the image on the basis of the entirety or a portion of the image obtained by the flexible image sensor 110 at the initial stage. A magnitude of a voltage to be applied according to the degree of distortion aberration of the image may be a value determined in advance and stored in a separate memory or may be calculated by the controller 20 in real time.

For example, a shape of a modified image sensor required to minimize each degree of distortion aberration may be obtained through various image processing techniques. The controller 20 may calculate a magnitude of a voltage to be applied to each actuator in real time on the basis of modification shape information of the image sensor previously determined according to a degree of distortion aberration.

Figure 4:
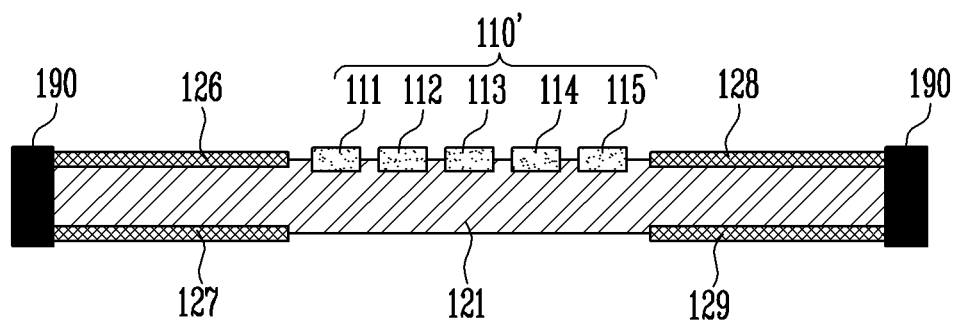
FIG. 4 is a cross-sectional view illustrating a modification example of the flexible image sensor of FIG. 3.

When the portion of the actuators 120, 130, 140 and 150 coupled to the rear side of the flexible image sensor 110 has a single rectangular shape, the flexible image sensor may be provided as a photoelectric element in units of pixels and directly embedded in the variable part of the actuators. FIG. 4 illustrates a flexible image sensor 110' according to the modified example.

The flexible image sensor 110' is formed by embedding a plurality of pixel electrodes 111, 112, 113, 114, and 115 directly on a front surface of a variable part 121 of an actuator at a predetermined interval. In the variable part 121 of the actuator, a shape of a portion in which the plurality of pixel electrodes 111, 112, 113, 114, and 115 are embedded is substantially the same as that of the flexible image sensor 110 of FIG. 2, and the variable part 121 in which the plurality of pixel electrodes 111, 112, 113, 114, and 115 are embedded is the flexible image sensor 110' by itself.

When a voltage is applied to electrodes of each of the actuators 120, 130, 140, and 150 by the controller 20, the shape of the flexible image sensor 110' is two-dimensionally modified as spaces between the plurality of pixel electrodes 111, 112, 113, 114, and 115 expand or contract.

In an embodiment, a separate controller controlling a voltage applied to the plurality of pixel electrodes 111, 112, 113, 114, and 115 may be further provided. The controller 20 may adjust spaces between the plurality of pixel electrodes 111, 112, 113, 114, and 115 by controlling driving of the actuator. Or, the controller 20 may be configured to control the plurality of pixel electrodes 111, 112, 113, 114, and 115, as well as controlling the actuator.

Figure 5:
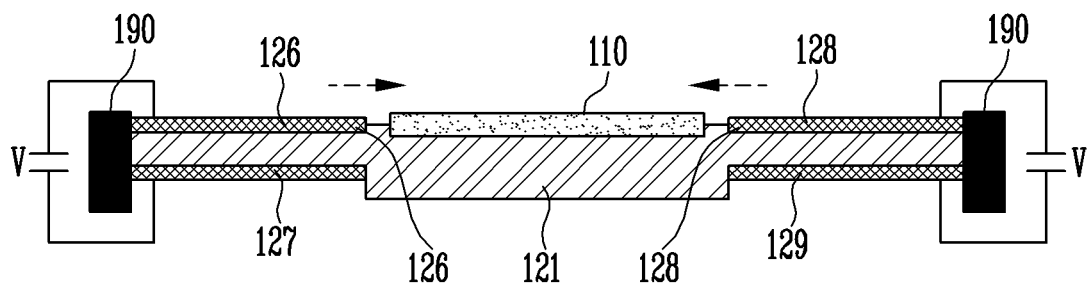
FIG. 5 is a cross-sectional view illustrating that the actuator of FIG. 3 operates.

FIG. 5 is a view of an operational state of the embodiment of FIG. 1, illustrating a state in which the flexible image sensor 110 contracts two-dimensionally when a voltage is applied to electrodes of each of the actuators 120, 130, 140, and 150 by the controller 20. FIG. 5 illustrates only the horizontal actuator 120, but the present invention is also applied to the vertical actuator 140 and the two diagonal actuators 130 and 150 in the same manner.

When a voltage V is applied to the pair of first electrodes 126 and 127 of the horizontal actuator 120 and a voltage V is applied to the pair of second electrodes 128 and 129 by the controller 20, a portion of the variable part 121 positioned between the pair of first electrodes 126 and 127 and a portion of the variable part 121 positioned between the pair of second electrodes 128 and 129 expand along a horizontal direction. Thus, the portion of the variable part 121 coupled to the flexible image sensor 110 is inwardly (in the direction of the arrows of FIG. 5) pressed to be reduced.

As described above, the controller 20 may independently control a degree of expanding or contracting of the horizontal actuator 120, the vertical actuator 140, and the two diagonal actuators 130 and 150.

For example, the controller 20 may apply a voltage to the electrodes of the vertical actuator 140 in the same manner as that of the horizontal actuator 120, and may not apply a voltage to the electrodes of the two diagonal actuators 130 and 150. The flexible image sensor 110 contract two-dimensionally to a shape indicated by the inner dotted line of FIG. 2 under the control of the controller 20.

Thus, the controller 20 may independently (or selectively) control a degree of varying each actuator to modify the flexible image sensor to various shapes. On the other hand, the flexible image sensor 110' according to a modified embodiment described above may also be modified in a 2D shape according to the same principle.

Figure 6:
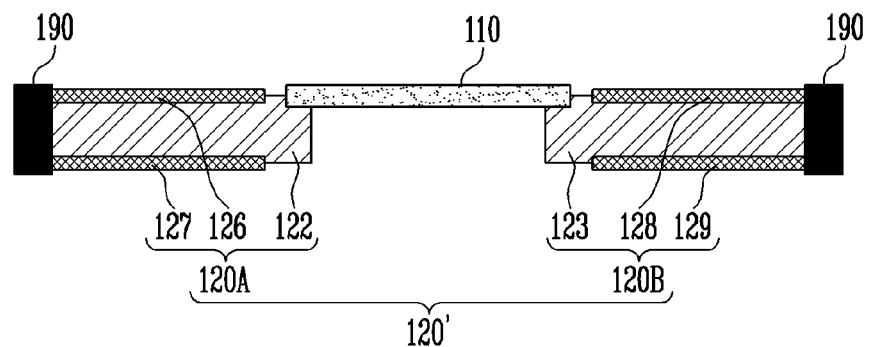
FIG. 6 is a cross-sectional view illustrating a modification example of the actuator of FIG. 3.

FIG. 6 is a cross-sectional view to which a horizontal actuator 120' according to a modified example is applied. The horizontal actuator 120' according to the modified example includes a left horizontal actuator 120A extending from a left edge of the flexible image sensor 110 to the support 190 and a right horizontal actuator 120B extending from a right edge of the flexible image sensor 110 to the support 190. The horizontal actuator 120' is coupled to the edge, without being coupled to the central portion of the rear side of the flexible image sensor 110.

The left horizontal actuator 120A includes a variable part 122 extending along a horizontal direction and having one end fixed to the left edge of the flexible image sensor 110 and the other end fixed to the support 190. The left horizontal actuator 120A includes a pair of first electrodes 126 and 127 attached to the front side and the rear side of the variable part 122 to correspond to each other.

The right horizontal actuator 120B includes a variable part 123 extending along a horizontal direction and having one end fixed to the right edge of the flexible image sensor 110 and the other end fixed to the support 190. The right horizontal actuator 120B includes a pair of first electrodes 128 and 129 attached to the front side and the rear side of the variable part 123 to correspond to each other.

That is, the horizontal actuator 120 according to the modified embodiment is modified such that the variable part 121 of the actuator 120 of FIG. 3 is coupled only to the edge of the flexible image sensor 110.

The vertical actuator 140 and the two diagonal actuators 130 and 150 may also be modified to be coupled only to the edge of the flexible image sensor 110 in the same manner.

Figure 7:
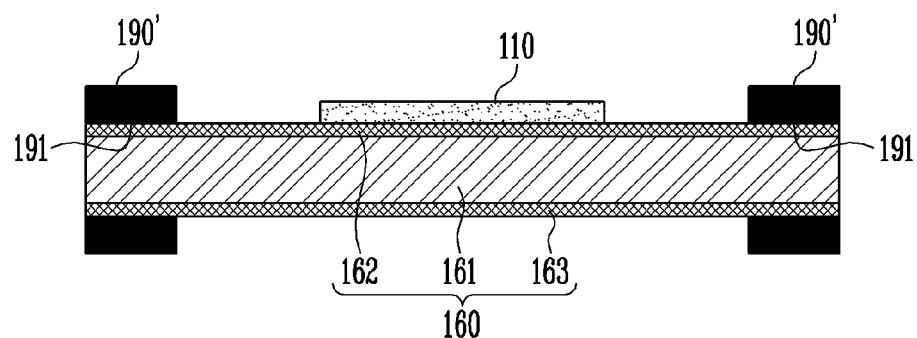
FIG. 7 is a side view illustrating another embodiment of the image sensing module.

FIG. 7 is a cross-sectional view of an image sensing module according to another embodiment. The image sensing module according to another embodiment includes a flexible image sensor 110, an actuator 160 two-dimensionally modifying the flexible image sensor 110, and a support 190' supporting the actuator 160.

The actuator 160 includes a variable part 161, a front electrode 162 coated on the entire front surface of the variable part 161 and a rear electrode 163 coated on the entire rear surface of the variable part 161. The flexible image sensor 110 is disposed on the front electrode 162 and an insulator (not shown) is provided between the flexible image sensor 110 and the front electrode 162 to insulate the flexible image sensor 110 and the front electrode 162.

The variable part 161 of the actuator 160 includes an electroactive polymer, and thus, when a voltage is applied, the variable part 161 expands. Since the electrodes 162 and 163 of the actuator 160 of FIG. 7 overlap the flexible image sensor 110, when a voltage is applied to the electrodes, the variable part 161 expands and the flexible image sensor 110 also expands.

The support 190' further has a through hole 191 through which both ends of the actuator 160 are inserted, and even when the actuator 160 expands, the support 190' may support the actuator 160.

The actuator 160 of FIG. 7 may have a cross-sectional shape in a I-I' direction when the horizontal actuator 120 of FIG. 2 is modified. Or, the actuator 160 of FIG. 7 may have a cross-sectional shape when at least one of the vertical actuator 140, the two diagonal actuators 130 and 150 is modified.

Figure 8:
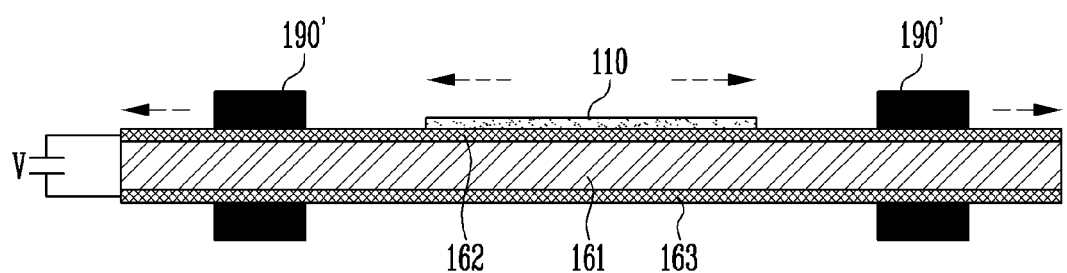
FIG. 8 is a cross-sectional view illustrating that the actuator of FIG. 7 operates.
Figure 9:
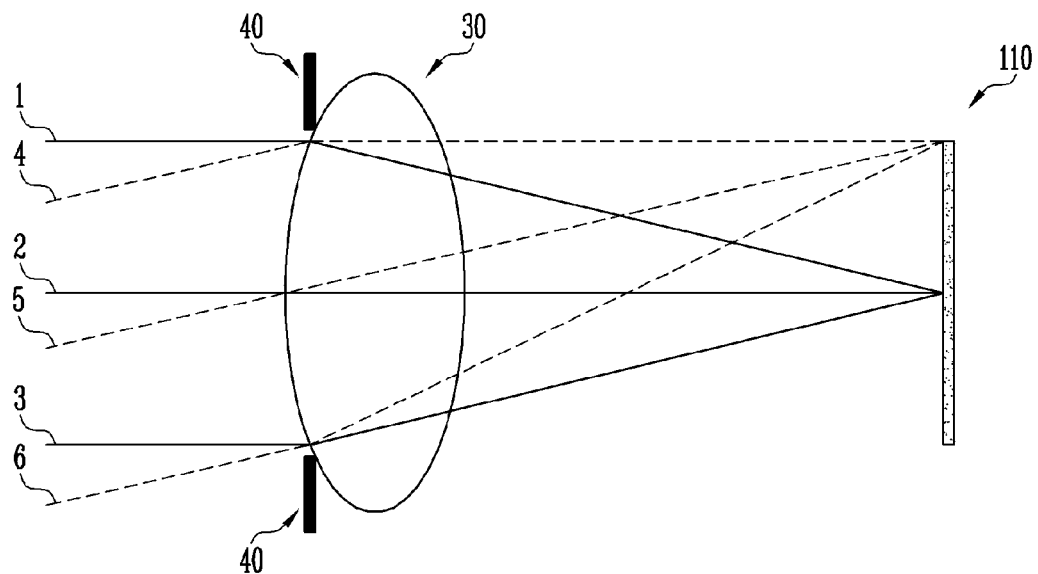
FIG. 9 is a side view illustrating that light is incident according to the embodiment of FIG. 1.

The image sensing module of FIG. 7 may be applied to the optical imaging device of FIG. 1, and a voltage applied to the electrodes 162 and 163 is controlled by the controller 20. FIG. 8 is a view illustrating a shape in which the flexible image sensor 110 expands two-dimensionally when a voltage V is applied to the electrodes 162 and 163 of the actuator 160 by the controller 20.

When a voltage is applied to the actuator 160, the variable part 161 expands outwardly in the arrow direction, and the flexible image sensor 110 expands together. The expanding actuator 160 may expand to be longer than the outer diameter of the support 190'.

Accordingly, the flexible image sensor 110 may two-dimensionally expand as indicated by the outer dotted line of FIG. 2.

An operational state of the present invention will be described in detail with reference to FIGS. 9 to 14. Light is incident from an object through the lens 30 in which an aperture 40 is provided on a front side. At this time, light beams 1, 2, and 3 are parallel to an optical axis of the lens 30 and light beams 4, 5, and 6 are incident slantingly to the optical axis of the lens 30, and distortion aberration may occur due to the light beams 4, 5, and 6 incident in an off-axis manner, as described above.

Figure 10:
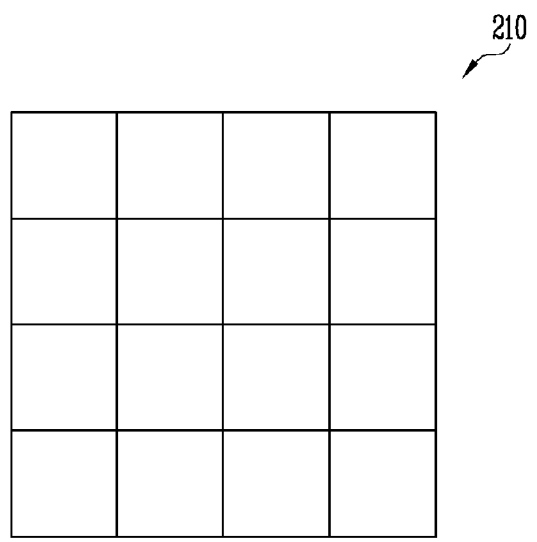
FIG. 10 is a plan view of an image in which distortion aberration is 0.
Figure 11:
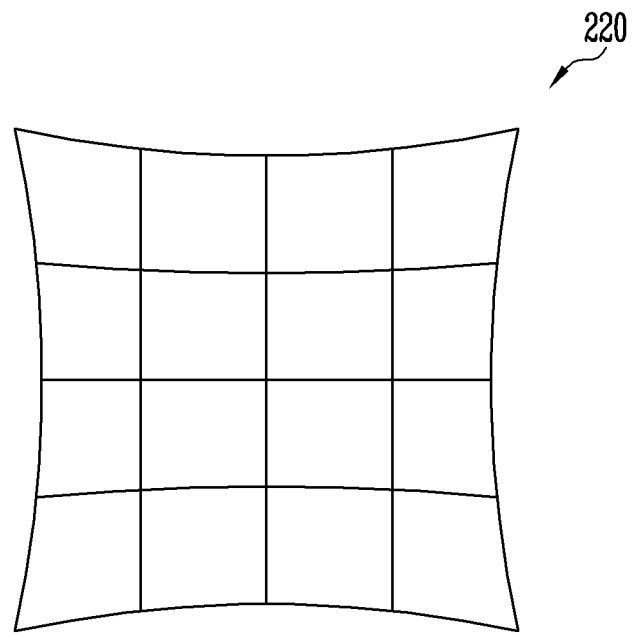
FIG. 11 is a plan view of an image in which distortion aberration is minus.
Figure 12:
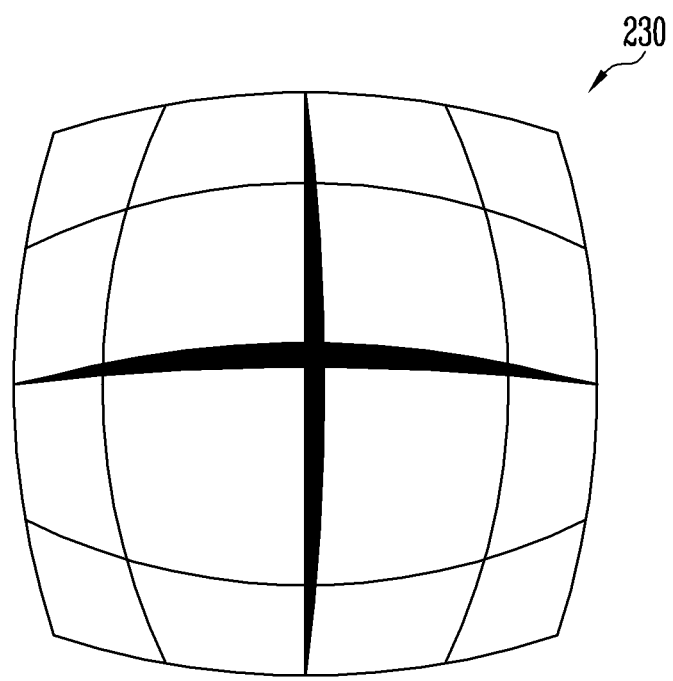
FIG. 12 is a plan view of an image in which distortion aberration is plus.
Figure 13:
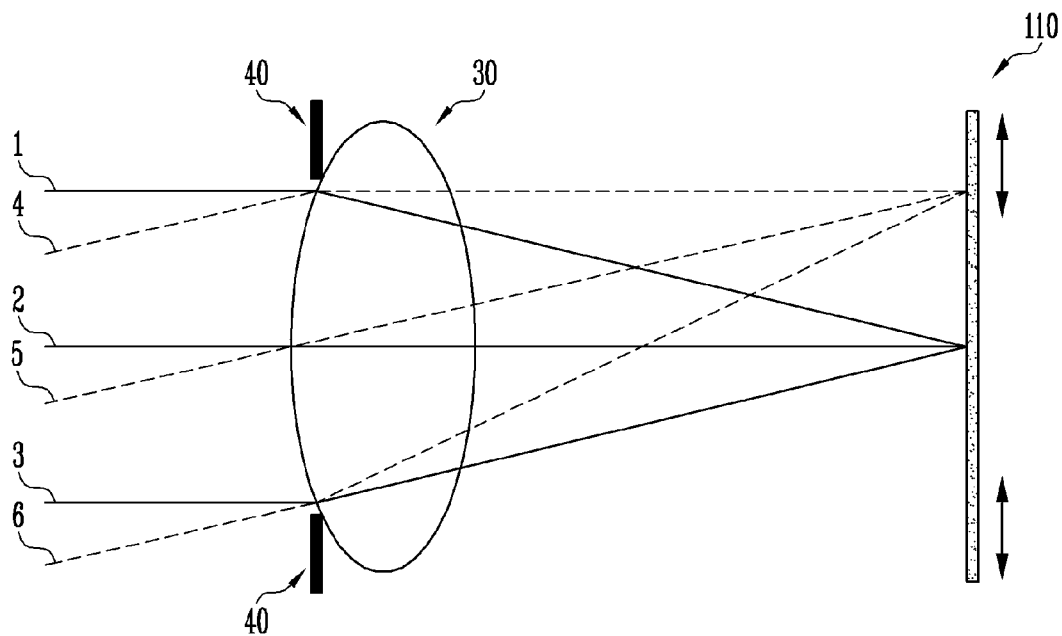
FIG. 13 is an operation state diagram illustrating that a flexible image sensor extends so that distortion aberration is minimized.

On the assumption that an image 210 having a wire mesh shape is photographed of FIG. 10, when a degree of distortion is minus, an image 220 of FIG. 11 is photographed, and when a degree of distortion is plus, an image 230 of FIG. 12 is photographed. The controller 20 may focus on an object desired to be photographed and photograph a reference image to determine a degree of distortion, that is, a degree of distortion aberration. As described above, the controller 20 controls driving of the actuator to two-dimensionally modify the flexible image sensor 110 in the arrow direction of FIG. 13. Distortion aberration may be minimized as the two-dimensional image of the flexible image sensor 110 is modified, and since an expanded or contracted image is obtained, a zoom function may be implemented even without moving the lens 30.

Figure 14:
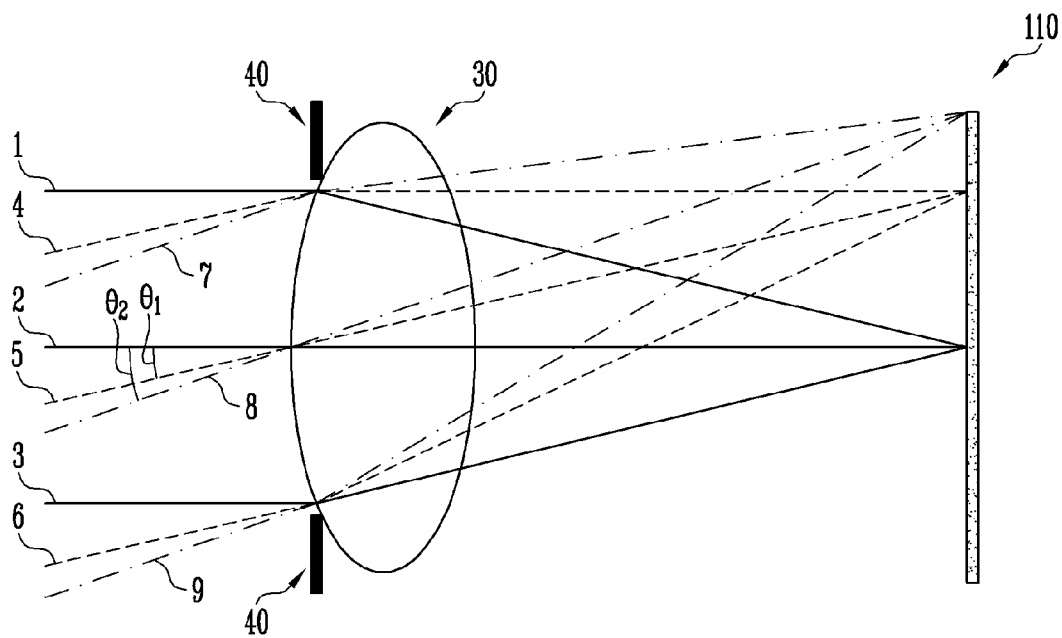
FIG. 14 is an operation state diagram illustrating that a view angle is improved by an extended flexible image sensor.

FIG. 14 is a view illustrating a shape in which a viewing angle is large when the flexible image sensor 110 expands two-dimensionally. The flexible image sensor 110 at the initial stage has a viewing angle having a size of $\theta_1$ by the light beams 1, 2, and 3 incident to be parallel to the optical axis and the light beams 4, 5, and 6 incident in an off-axis manner.

On the other hand, the flexible image sensor 110 illustrated in FIG. 14 expands, and thus, even light beams 7, 8, and 9 incident slantingly at a larger angle with respect to the optical axis of the lens 30 are focused on the expanded flexible image sensor 110 and have a viewing angle of about $\theta_2$. Thus, the viewing angle may be controlled even without moving the lens 30.

What is claimed is:

1. An optical imaging device comprising:
    a flexible image sensor;
    an actuator that two-dimensionally expands or contracts the flexible image sensor in a plane parallel to a top surface of the flexible image sensor; and
    a support that fixes an end of the actuator,
    wherein the actuator is coupled to at least one edge of the flexible image sensor,
    wherein the actuator two-dimensionally contracts the flexible image sensor as a length from the support to the edge of the flexible image sensor is increased, and
    wherein the actuator two-dimensionally expands the flexible image sensor as the length from the support to the edge of the flexible image sensor is reduced.

2. The optical imaging device of claim 1, further comprising:
    a lens that faces the flexible image sensor,
    wherein the plane of the top surface of the flexible image sensor is perpendicular to an optical axis of the lens.

3. The optical imaging device of claim 1, further comprising:
    a controller that controls a degree of deforming the flexible image sensor by controlling the actuator.

4. The optical imaging device of claim 3, wherein the controller controls the actuator to achieve one or more of minimization of distortion aberration of an image initially obtained by the flexible image sensor, expansion of the initially obtained image, contraction of the initially obtained image, and adjustment of a viewing angle of the initially obtained image.

5. The optical imaging device of claim 3, wherein the actuator includes an electroactive polymer, and
    wherein the controller controls the actuator by controlling a voltage applied to the actuator.

6. The optical imaging device of claim 1, wherein the actuator includes:
   a variable part, to which the flexible image sensor is coupled, and including an electroactive polymer; and
   a plurality of electrodes partially provided in the variable part, and
   wherein the plurality of electrodes does not overlap the flexible image sensor.

7. The optical imaging device of claim 1, wherein the support has a through hole through which the actuator movably penetrates, and
   wherein the actuator further extends to pass through the through hole to two-dimensionally expand the flexible image sensor.

8. The optical imaging device of claim 1, wherein the actuator includes:
   a variable part, to which the flexible image sensor is coupled, and including an electroactive polymer; and
   a plurality of electrodes at least partially provided on the variable part, and
   wherein at least one of the plurality of electrodes overlaps the flexible image sensor.

9. The optical imaging device of claim 1, wherein the flexible image sensor includes a plurality of pixel electrodes, and
   wherein the plurality of pixel electrodes are partially embedded in the actuator.

10. The optical imaging device of claim 9, wherein the actuator includes a variable part in which the plurality of pixel electrodes are embedded, and
   wherein the variable part includes an electroactive polymer.

* * * * *